(12) United States Patent
Nagao et al.

(10) Patent No.: US 9,751,075 B2
(45) Date of Patent: Sep. 5, 2017

(54) CERIA-ZIRCONIA COMPLEX OXIDE MATERIAL AND METHOD FOR PRODUCING SAME

(71) Applicants: TOYOTA JIDOSHA KABUSHIKI KAISHA, Toyota-shi, Aichi-ken (JP); NATIONAL UNIVERSITY CORPORATION NAGOYA UNIVERSITY, Nagoya-shi, Aichi-ken (JP)

(72) Inventors: Satoshi Nagao, Gotenba (JP); Takashi Minami, Toyota (JP); Shinichi Matsumoto, Tougou-cho (JP); Hirohito Hirata, Nagaizumi-cho (JP); Masakuni Ozawa, Nagoya (JP)

(73) Assignees: TOYOTA JIDOSHA KABUSHIKI KAISHA, Toyota (JP); NATIONAL UNIVERSITY CORPORATION NAGOYA UNIVERSITY, Nagoya (JP)

(*) Notice: Subject to any disclaimer, the term of this patent is extended or adjusted under 35 U.S.C. 154(b) by 4 days.

(21) Appl. No.: 14/738,384

(22) Filed: Jun. 12, 2015

(65) Prior Publication Data

US 2015/0375202 A1    Dec. 31, 2015

(30) Foreign Application Priority Data

Jun. 26, 2014 (JP) .................. 2014-131651

(51) Int. Cl.
| | |
|---|---|
| B01J 23/10 | (2006.01) |
| B01D 53/94 | (2006.01) |
| B01J 21/06 | (2006.01) |
| B01J 37/03 | (2006.01) |
| B01J 37/16 | (2006.01) |
| B01J 35/00 | (2006.01) |
| C01G 25/02 | (2006.01) |
| B01J 23/63 | (2006.01) |
| B01J 23/00 | (2006.01) |
| B01J 37/18 | (2006.01) |
| B01J 37/12 | (2006.01) |
| B01J 37/04 | (2006.01) |
| B01J 37/08 | (2006.01) |

(52) U.S. Cl.
CPC .......... *B01J 23/10* (2013.01); *B01D 53/9413* (2013.01); *B01J 21/066* (2013.01); *B01J 23/002* (2013.01); *B01J 23/63* (2013.01); *B01J 35/00* (2013.01); *B01J 35/0006* (2013.01); *B01J 37/031* (2013.01); *B01J 37/04* (2013.01); *B01J 37/08* (2013.01); *B01J 37/12* (2013.01); *B01J 37/16* (2013.01); *B01J 37/18* (2013.01); *C01G 25/02* (2013.01); *B01D 2255/102* (2013.01); *B01D 2255/106* (2013.01); *B01D 2255/20715* (2013.01); *B01D 2255/20738* (2013.01); *B01D 2255/20753* (2013.01); *B01D 2255/20761* (2013.01); *B01D 2255/407* (2013.01); *B01D 2255/908* (2013.01); *B01D 2255/92* (2013.01); *B01D 2255/9202* (2013.01); *C01P 2002/36* (2013.01); *C01P 2002/60* (2013.01); *C01P 2002/76* (2013.01); *C01P 2002/82* (2013.01); *C01P 2004/03* (2013.01); *C01P 2004/04* (2013.01); *C01P 2004/82* (2013.01)

(58) Field of Classification Search
None
See application file for complete search history.

(56) References Cited

U.S. PATENT DOCUMENTS

| | | | |
|---|---|---|---|
| 6,576,207 B1* | 6/2003 | Mussmann | B01D 53/945 423/212 |
| 2013/0310248 A1 | 11/2013 | Aoki et al. | |
| 2015/0209760 A1* | 7/2015 | Asanuma | B01J 23/63 502/304 |

FOREIGN PATENT DOCUMENTS

| | | |
|---|---|---|
| CN | 1114487 C | 7/2003 |
| JP | 2009-084061 A | 4/2009 |
| JP | 2012-239982 A | 12/2012 |
| WO | 2014/041984 A1 | 3/2014 |

OTHER PUBLICATIONS

Yeste, M. Pilar, et al. "Rational Design of Nanostructured, Noble Metal Free, Ceria-Zirconia Catalysts with Outstanding Low Temperature Oxygen Storage Capacity". Journals of Materials Chemistry A. vol. 1. Feb. 12, 2013. pp. 4836-4844.

\* cited by examiner

*Primary Examiner* — Melvin C Mayes
*Assistant Examiner* — Michael Forrest
(74) *Attorney, Agent, or Firm* — Oliff PLC

(57) ABSTRACT

A satisfactory oxygen storage material and a method for producing it are provided. The oxygen storage material comprises zirconia particles with a ceria-zirconia complex oxide supported on the zirconia particles. The ceria-zirconia complex oxide includes a pyrochlore phase and has a mean crystallite diameter of 10 nm to 22.9 nm.

1 Claim, 12 Drawing Sheets

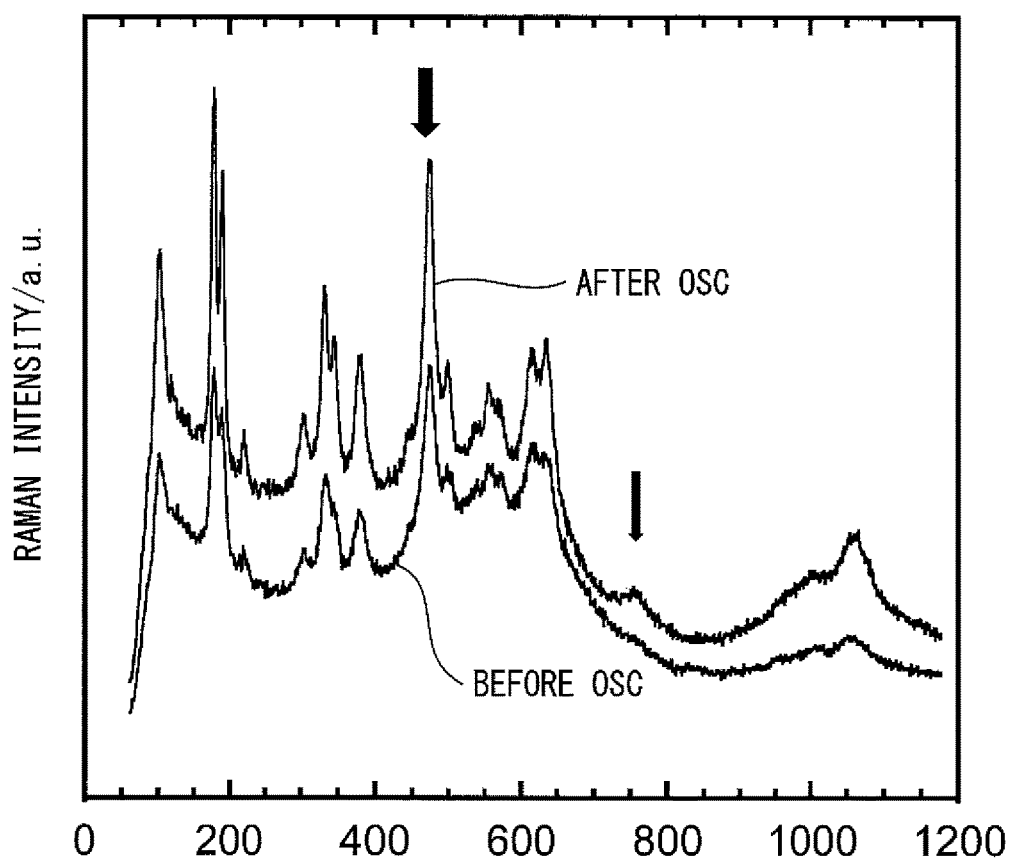

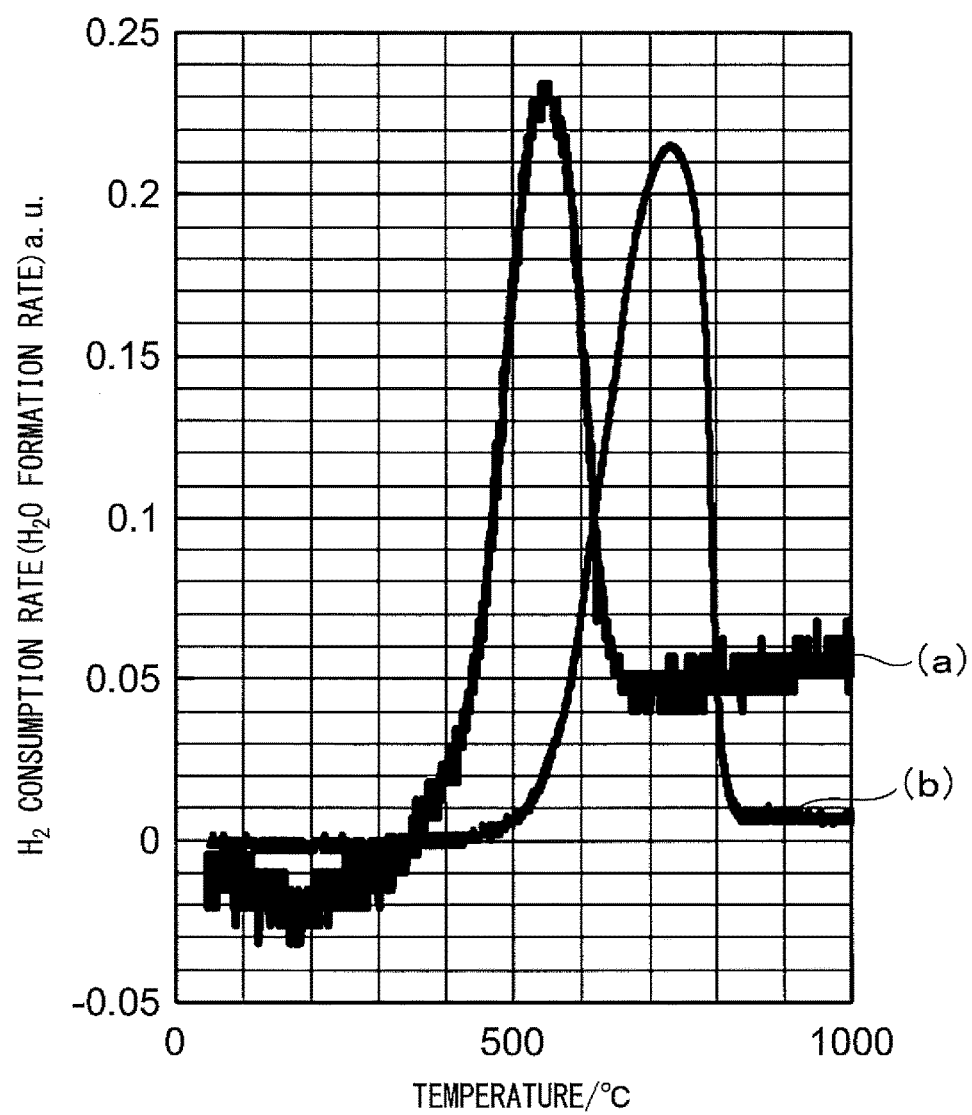

CERIA-ZIRCONIA COMPLEX OXIDE MATERIAL AND METHOD FOR PRODUCING SAME

TECHNICAL FIELD

The present invention relates to an exhaust gas purification catalyst, and particularly to a catalyst comprising an oxygen storage material, and to a method for producing it.

BACKGROUND ART

Exhaust gas from internal combustion engines such as automobile engines include hydrocarbons (hereunder also abbreviated as "HC") and the like, and it is known that such substances can be removed by combustion catalysts. Also, with engine exhaust gas purification catalysts, they can be removed by so-called three-way catalysts for exhaust gas purification that allow oxidation of the carbon monoxide (CO) and hydrocarbons simultaneously with reduction of the nitrogen oxides (hereunder also abbreviated as NOx).

As a means of absorbing fluctuations in oxygen concentration of exhaust gas and increasing exhaust gas purification power, it is known to use a material with oxygen storage capacity (hereunder also abbreviated as "OSC") that can store oxygen when the oxygen concentration of the exhaust gas is high and release oxygen when the oxygen concentration of the exhaust gas is low, as a support for the exhaust gas purification catalyst.

It is known that cerium oxides and cerium zirconium complex oxides, or their solid solutions, are excellent materials as OSC, and these are either combined with alumina supports, so that their chemical properties and those of the supports are utilized to promote purification of exhaust gas, or they may be used without such combination.

PTL 1 describes a ceria-zirconia-based complex oxide comprising a complex oxide of ceria and zirconia, a pyrochlore phase-type ordered array phase being formed by cerium ion and zirconium ion in the complex oxide, and about half of the pyrochlore phase-type ordered array phase remaining even after high-temperature heating in air (PTL 1, claim 1).

CITATION LIST

Patent Literature

[PTL 1] Japanese Unexamined Patent Publication No. 2009-084061

Non-Patent Literature

[NPL 1] Journal of Materials Chemistry A, 2013, 1, 4836-4844.

DISCLOSURE OF THE INVENTION

Problems to be Solved by the Invention

There is no shortage of cerium production as a resource, but because it is found in only limited locations, efforts have been made to use other elements or components with special features, as substitutes for or in combination with it.

It has therefore been desired to improve the performance of other elements that exhibit properties equivalent to, for example, cerium oxides or cerium zirconium complex oxides.

Conventional oxides exhibiting OSC have large particle diameters and produce oxygen diffusion only on the surface layer sections of the crystallites at low temperatures of below 450° C., and therefore catalyst materials with higher oxygen storage capacity and exhibiting more OSC at low temperature are desired. Improvement in OSC performance may be expected by forming ceria-zirconia crystals having an orderly phase formed by controlling the fine pores and form of the catalyst oxide, but such control, and oxides with smaller crystallite diameters, have not yet been achieved.

Means for Solving the Problems

As a result of diligent efforts, the present inventors have accomplished this invention upon finding that it is possible to form an orderly phase even in a ceria-zirconia complex oxide with small crystallite diameters, by loading a ceria-zirconia complex oxide on zirconia particles and carrying out reduction treatment and the like.

The modes of the present invention are as follows.

(1) An oxygen storage material comprising:
zirconia particles and
a ceria-zirconia complex oxide supported on them,
wherein the ceria-zirconia complex oxide includes a pyrochlore phase and has a mean crystallite diameter of 10 nm to 22.9 nm.

(2) An oxygen storage material according to (1), wherein the zirconia particles have monoclinic crystals, and the molar ratio of Ce/Zr in the ceria-zirconia complex is 0.90 to 1.10.

(3) An oxygen storage material according to (1) or (2), wherein the mean crystallite diameter of the ceria-zirconia complex oxide is 15 nm or smaller.

(4) A method for producing an oxygen storage material according to (1), including the following steps in order:
(i) preparing an aqueous solution containing:
a water-soluble cerium salt,
a water-soluble zirconium salt or oxyzirconium salt,
a complexing agent that is an alkylcarboxylic acid and/or an alkylcarboxylic acid salt, and
metal oxide particles,
(ii) adding an aqueous alkali solution to the aqueous solution of (i),
(iii) holding the aqueous solution mixture of (ii) at a temperature of 150° C. to 220° C. for 0.5 hour to 72 hours to produce a solid product by precipitation,
(iv) holding the solid product at a temperature of 500° C. to 700° C. for 1 hour to 5 hours and then at a temperature of 700° C. to 1100° C. for 1 hour to 5 hours, and
(v) further subjecting the solid product to temperature-programmed reduction treatment.

Effect of the Invention

Since the crystallite diameters of these modes of the invention are small and a ceria-zirconia complex oxide having a pyrochlore phase is supported on zirconia particles, it has become possible to provide a catalyst that minimizes the use of cerium. In addition, since oxygen diffusion occurs at virtually all of the sites in the crystallites even at a low temperature of below 450° C., it has become possible to provide a catalyst that can increase the oxygen storage capacity (Ce utilization factor) at low temperature, and that has high efficiency from low temperatures and excellent stabilized performance.

BRIEF DESCRIPTION OF THE DRAWINGS

FIG. 2(b) is a graph showing the measurement results for Raman intensity with respect to wavelength for the specimen of Example 1(b), before and after evaluation of the oxygen storage capacity (OSC).

FIG. 4 is graph showing the measured and calculated results for $H_2$ consumption rates with respect to temperature (with respect to theoretical $H_2$ consumption rate (%): arbitrary scale (a.u.)) for the specimens of Example 1(b) (FIG. 4(a)) and Comparative Example 4 (FIG. 4(b)).

BEST MODE FOR CARRYING OUT THE INVENTION

Figure 1A:
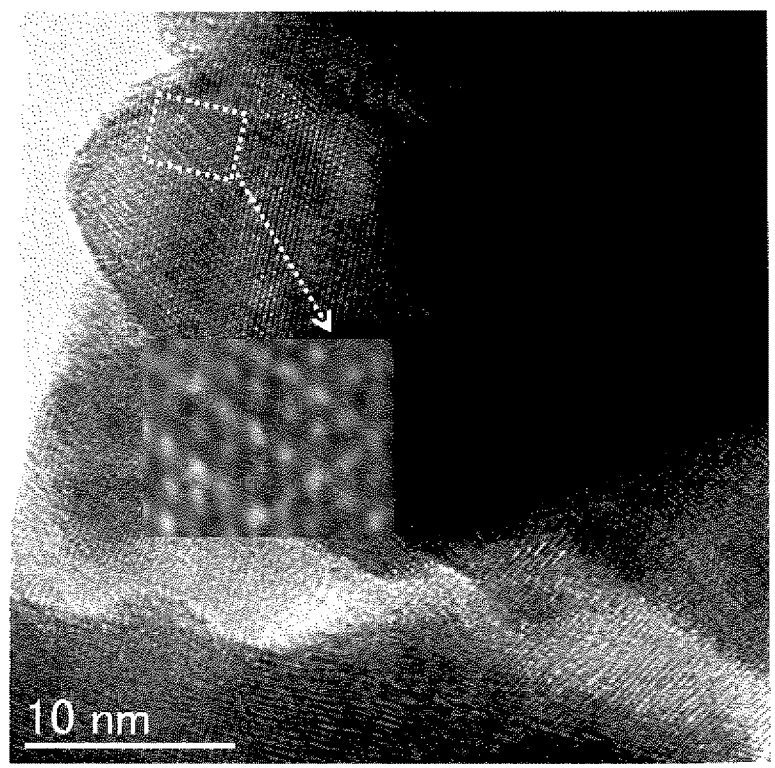
FIG. 1(a) is a TEM photograph of the specimen of Example 1(b) (1000° C. oxidizing treatment in step 2).
Figure 1B:
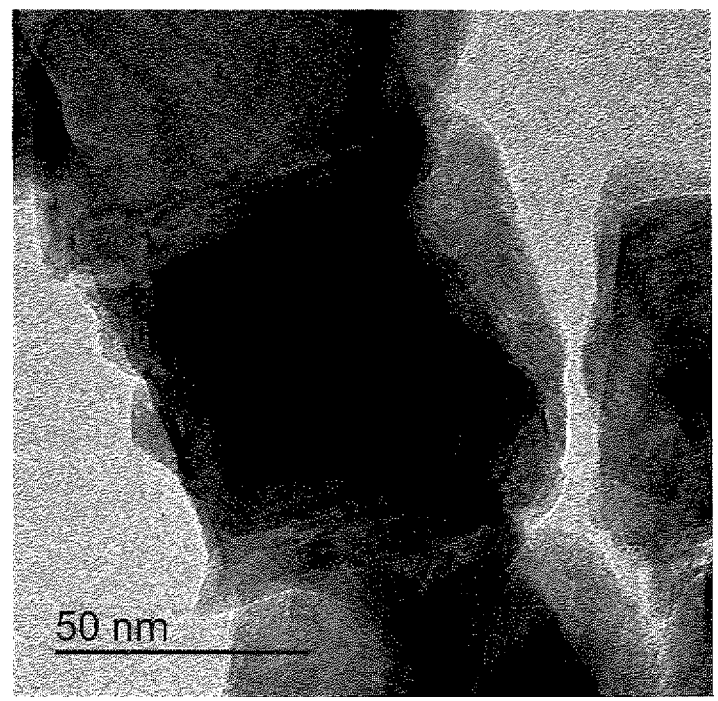
FIG. 1(b) is a TEM photograph of the specimen of Example 1(b).

The oxygen storage material according to a mode of the invention includes a ceria-zirconia complex oxide supported on zirconia particles, the ceria-zirconia complex oxide having a mean crystallite diameter of 10 nm to 22.9 nm, and preferably including a pyrochlore phase having a crystal structure forming a lattice having twice the periodicity of a $CeO_2$ fluorite structure.

Throughout the present specification, a "pyrochlore phase-type ordered array phase" means an array structure of crystals (φ' phase (same phase as the kappa-phase)-type ordered array phase: the superlattice structure generated in a fluorite structure) having peaks at locations where the 2θ angle is 14°, 28°, 37°, 44.5° and 51° in the X-ray diffraction pattern using CuKα that is obtained by X-ray diffraction (XRD). The method of X-ray diffraction measurement used was a method of measurement under conditions of 30 KV, 40 mA, 2θ=2°/min, with CuKα rays using a RINT2100 (trade name) by Rigaku Corp. as the measuring apparatus. Alternatively, for transmission electron microscope (TEM) measurement, the characteristic lattice image derived from the atomic arrangement may be obtained by observation of microregions with high resolution, and used to identify the pyrochlore-type ordered array phase. When the crystals are extremely small as in the case of the specimens of the examples, they are microparticles or microregions exceeding the measurement limit of analysis by normal X-ray diffraction, and when the structures in such particles are to be identified, there is employed a method using a JEM-2100F by JEOL Corp. or an HD-2000 by Hitachi, Ltd., equipped with a field emission electron gun, or another high-resolution electron microscope method.

Furthermore, since the ceria-zirconia complex oxide has such a mean crystallite diameter and a pyrochlore phase, the oxygen storage material of this mode of the invention allows the usage of cerium to be minimized, while exhibiting low-temperature and high-efficiency oxygen storage capacity even if the catalyst has a precious metal supported either directly or over it.

Throughout the present specification, a ceria-zirconia complex oxide is a solid solution of ceria ($CeO_2$) and zirconia ($ZrO_2$), with at least a portion thereof forming a pyrochlore phase.

The ceria-zirconia complex oxide with a pyrochlore phase may be represented as $Ce_2Zr_2O_{7-8}$, being $Ce_2Zr_2O_7$ when in the reduced state of $Ce^{3+}$, and $Ce_2Zr_2O_8$ when in the oxidized state of $Ce^{4+}$, or it may have a chemical formula intermediate between these.

The mean crystallite diameter of the ceria-zirconia complex oxide may be about 5 nm or larger, about 6 nm or larger, about 7 nm or larger, about 8 nm or larger, about 9 nm or larger, about 10 nm or larger, about 11 nm or larger, about 12 nm or larger, about 13 nm or larger or about 14 nm or larger, and about 25 nm or smaller, about 24 nm or smaller, about 23 nm or smaller, about 22.9 nm or smaller, about 22 nm or smaller, about 21 nm or smaller, about 20 nm or smaller, about 19 nm or smaller, about 18 nm or smaller, about 17 nm or smaller, about 16 nm or smaller or about 15 nm or smaller.

The oxygen storage material according to a mode of the invention is in the form of fine particles of the ceria-zirconia complex oxide or an at least partially continuous ceria-zirconia layer, supported on zirconia particles.

Also, the oxygen storage material may have a core-shell structure with zirconia particles as the core and the ceria-zirconia complex oxide as the shell.

When the ceria-zirconia complex oxide is in the form of fine particles or a layer, the mean particle diameter or average layer thickness is not particularly restricted so long as there is no problem with the mean crystallite diameter being produced and with oxygen storage and release, etc., and for example, it may be any desired value within the range of about 10 nm to about 999 nm. It may even be a porous body.

The proportion of Ce with respect to Zr in the ceria-zirconia complex oxide is not particularly restricted so long as it is a complex oxide and it forms a pyrochlore phase, without problems occurring, and it may be, as the molar ratio, Ce/Zr=about 0.70 or greater, about 0.75 or greater, about 0.80 or greater, about 0.85 or greater, about 0.90 or greater, about 0.95 or greater, about 0.99 or greater or about 1.00 or greater, and about 1.40 or less, about 1.35 or less, about 1.30 or less, about 1.25 or less, about 1.20 or less, about 1.15 or less, about 1.10 or less, about 1.05 or less or about 1.01 or less.

For this mode of the invention, the amounts of Ce and Zr used may be such that the molar ratio of Ce/Zr is about 0.05 or greater, about 0.10 or greater, about 1/9 or greater, about 0.15 or greater, about 0.20 or greater, about 0.25 or greater, about 0.30 or greater, about 0.35 or greater, about 0.40 or greater, about 3/7 or greater or about 0.45 or greater, and about 1.10 or less, about 1.05 or less, about 1.00 or less, about 0.95 or less, about 0.90 or less, about 0.85 or less, about 0.80 or less, about 0.75 or less, about 0.70 or less, about 0.65 or less, about 0.60 or less, about 0.55 or less, about 0.50 or less or about 0.48 or less, based on the total of Ce and Zr in the zirconia particles and ceria-zirconia complex oxide fine particles.

Of these ranges, Ce/Zr is preferably about 0.10 or greater and about 0.50 or less, as this will allow smooth progress without preventing the molar ratio of Ce with respect to Zr in the ceria-zirconia complex oxide from being a ratio within the fixed range, including 0.90 to 1.10, for example.

The mean particle diameter of the zirconia particles is not particularly restricted so long as the ceria-zirconia complex oxide can be supported on it, and it may have a mean particle diameter of about 5 nm to about 1000 for example.

The oxygen storage material of this mode of the invention may have metal fine particles, commonly used as a catalyst, supported thereon for use as an exhaust gas purification catalyst, where the metal fine particles may be, for example, of a metal such as ruthenium (Ru), rhodium (Rh), palladium (Pd), osmium (Os), iridium (Ir), platinum (Pt), gold (Au), copper (Cu), iron (Fe), nickel (Ni) or the like, or an oxide or any desired combinations of the foregoing, having particle diameters of about 3 nm to about 5 nm or the like, supported in an amount of about 0.01 wt % to about 5.0 wt %, for example.

There are no particular restrictions on the method for loading the metal fine particles or the like on a support for an exhaust gas purification catalyst according to this mode of the invention, and common methods such as impregnation loading, surface deposition or the like may be used.

The ceria-zirconia complex oxide for this mode of the invention may be obtained using a commonly known method, such as a method of producing a precipitate from an aqueous solution by neutralization to the alkaline end, and heating, or a method of producing a decomposable compound as a metal oxide from a gas phase at high temperature, without any particular restrictions so long as there is no adverse effect on the particle diameter and pyrochlore phase.

With the oxygen storage material of this mode of the invention, it is possible to easily form a crystal structure with a pyrochlore phase without requiring the use of any special high-boiling-point solvent, by carrying out the process in an aqueous system with addition of the aqueous solution described below to zirconia particles with heat resistance.

Specifically, the oxygen storage material of this mode of the invention can be produced by a mode of the method of the invention; for example, by adding an alkaline aqueous solution to an aqueous solution containing a water-soluble cerium salt, a water-soluble zirconium or oxyzirconium salt, a carboxylic acid and/or carboxylic acid salt as an optional complexing agent, and metal oxide particles, for neutralization of the pH to about 10 to about 14, and conducting a hydrothermal step in which it is held at high temperature for a fixed period of time, after which the produced precipitate is subjected to heat treatment at a higher temperature for a fixed period of time.

While it is not our desire to be constrained to any particular theory, the water-soluble zirconium salt has zirconium ion ($Zr^{4+}$) while the oxyzirconium salt has zirconyl ion ($ZrO^{2+}$), and it is possible that both likewise generate $ZrO_2$ in the ceria-zirconia complex. Therefore, either a zirconium salt or oxyzirconium salt may be used.

The water-soluble cerium salt to be used for this mode of the method of the invention may be cerium nitrate, cerium ammonium nitrate, cerium chloride, cerium sulfate or the like.

Water-soluble zirconium-containing salts to be used include zirconium oxynitrate, zirconium oxychloride, oxyzirconium acetate and the like, as well as other inorganic salts.

For this mode of the method of the invention, a carboxylic acid and/or carboxylic acid salt may be added as a complexing agent, in which case the carboxylic acid or carboxylic acid salt is not particularly restricted so long as it is negatively charged and can function as a complexing agent that can coordinate with the aforementioned salt, with examples to be used including salts of saturated or unsaturated, mono- or poly-carboxylic acids containing C3 to C20 alkyl groups, such as stearic acid, oleic acid, decanoic acid, dodecanoic acid, tetradecanoic acid, nonanoic acid, octanoic acid or citric acid, or salts of these carboxylic acids with alkali metals such as Li, Na or K, etc., or alkaline earth metals such as Mg or Ca, etc. Addition of these complexing agents is preferred to allow production of a stable pyrochlore phase.

As metal oxide particles there may be used alumina, titania, zirconia or the like, with zirconia being preferred as it allows the ceria-zirconia complex oxide to generate a stable pyrochlore phase.

The aqueous alkali solution used is not particularly restricted so long as it can neutralize the pH of the aqueous solution to the alkaline end of 10 to 14 without adverse effects, and examples thereof include ammonia water, sodium hydroxide and potassium hydroxide, etc.

For this mode of the method of the invention, these compounds may be added in such a manner that Ce:Zr is at the desired molar ratio based on the total of the aforementioned metal oxide particles and ceria-zirconia complex oxide fine particles.

The temperature and time for the hydrothermal step according to this mode of the method of the invention may be about 120° C. or higher, about 130° C. or higher, about 140° C. or higher, about 150° C. or higher, about 160° C. or higher, about 170° C. or higher or about 180° C. or higher, and about 250° C. or lower, about 240° C. or lower, about 230° C. or lower, about 220° C. or lower, about 210° C. or lower, about 200° C. or lower or about 190° C. or lower, and about 0.1 hour or more, about 0.3 hour or more, about 0.5 hour or more, about 0.7 hour or more, about 1 hour or more, about 2 hours or more or about 3 hours or more, and about 96 hours or less, about 84 hours or less, about 72 hours or less, about 60 hours or less, about 48 hours or less, about 36 hours or less, about 24 hours or less or about 12 hours or less.

The temperature and time for heat treatment of the precipitate that is produced may be, at the early stage, about 300° C. or higher, about 350° C. or higher, about 400° C. or higher, about 450° C. or higher, about 500° C. or higher, about 550° C. or higher or about 600° C. or higher, and about 900° C. or lower, about 850° C. or lower, about 800° C. or lower, about 750° C. or lower, about 700° C. or lower or about 650° C. or lower, and about 1 hour or mare, about 2 hours or more or about 3 hours or more, and about 7 hours or less, about 6 hours or less, about 5 hours or less or about 4 hours or less, and at the later stage, about 600° C. or higher, about 650° C. or higher, about 700° C. or higher, about 750° C. or higher, about 800° C. or higher, about 850° C. or higher or about 900° C. or higher and about 1300° C. or lower, about 1250° C. or lower, about 1200° C. or lower, about 1150° C. or lower, about 1100° C. or lower, about 1050° C. or lower, about 1000° C. or lower or about 950° C. or lower, and about 1 hour or more, about 2 hours or more or about 3 hours or more and about 7 hours or less, about 6 hours or less, about 5 hours or less or about 4 hours or less.

The temperature-programmed reduction treatment according to this mode of the method of the invention is not particularly restricted so long as a pyrochlore phase can be produced and there are no adverse effects such as breakdown of the order of the crystal structure of the pyrochlore phase, and for example, it may be carried out under the following conditions. Specifically, a gas stream containing a reducing gas, such as 5 vol % hydrogen-95 vol % argon, for example, at a flow rate of about 1 ml/min or greater, about 5 ml/min or greater, about 10 ml/min or greater, about 20 ml/min or greater, about 30 ml/min or greater, about 40 ml/min or greater or about 50 ml/min or greater, and about 2,000 ml/min or less, about 1,000 ml/min or less, about 800 ml/min or less, about 500 ml/min or less, about 300 ml/min or less or about 100 ml/min or less, may be increased in temperature from a low temperature of room temperature (about 25° C.) to a high temperature of about 600° C. or higher, about 650° C. or higher, about 700° C. or higher, about 750° C. or higher, about 800° C. or higher, about 850° C. or higher, about 900° C. or higher, about 950° C. or higher or about 1000° C. or higher and about 1500° C. or lower, about 1450° C. or lower, about 1400° C. or lower, about 1350° C. or lower, about 1300° C. or lower, about 1250° C. or lower, about 1200° C. or lower, about 1150° C. or lower or about 1100° C. or lower, at a temperature-elevating rate of about 1° C./min or greater, about 5° C./rain or greater, about 10° C./min or greater, about 20° C./min or greater, about 30° C./min or greater or about 40° C./min or greater and about 200° C./min or less, about 150° C./min or less, about 100° C./rain or less or about 50° C./min or less. This is merely an exemplary list, however, and the conditions for temperature-programmed reduction treatment according to this mode of the method of the invention is not limited only to the flow rates, temperature-elevating rates and high temperatures mentioned above so long as a pyrochlore phase can be produced and there are no adverse effects such as breakdown of the order of the crystal structure of the pyrochlore phase, etc.

Ceria or ceria-zirconia has hitherto been considered promising as an oxygen storage material because it releases and absorbs oxygen from about 300° C. It is also known that a ceria-zirconia orderly phase can be obtained by reduction treatment of solid-solution ceria-zirconia at high temperature.

Generally, however, ceria and ceria-zirconia complex oxides have formed coarse particles with large particle diameters when subjected to such high-temperature treatment. For this reason it has not been possible to obtain sufficient performance as oxygen diffusion takes place only on the surface layer section of the crystallites at low temperatures of below 450° C., and higher oxygen storage capacity has therefore been desired.

Furthermore, no case has been known where synthesis of the fine particles or layer (crystal) of the ceria-zirconia complex oxide takes place directly on the zirconia particles to produce a core-shell structure, when the molar ratio of Ce with respect to Zr in ceria-zirconia is near 1.

On the other hand, a pyrochlore phase by itself can generally be created by carrying out production under reducing conditions at a high temperature of 1200° C. or higher, and then further repeating oxidation-reduction, and it is known that the amounts of oxygen release and absorption stoichiometrically match the trivalent and tetravalent conversion of cerium, i.e. that the cerium utilization factor is nearly 100%.

On the other hand, for this mode of the invention, the ceria-zirconia complex oxide is supported on at least some of the zirconia particles. Furthermore, while it is not our desire to be constrained by theory, it is presumably because the lattice spacing and crystal surfaces of the zirconia particles and the lattice spacing and crystal surfaces of the ceria-zirconia complex oxide are satisfactorily matching, that it was possible to avoid large growth of the crystallite diameters and form a ceria-zirconia complex oxide having a pyrochlore phase and small crystallite diameters.

Moreover, while not being constrained by any particular theory, it is presumably because the lattice spacing and crystal surfaces of the ceria-zirconia complex oxide and zirconia particles are matching that, surprisingly, it has become possible as described below, not only to produce a pyrochlore phase by temperature-programmed reduction treatment at about 900° C. or lower, for example, i.e. at much lower temperature than the prior art, and to form the pyrochlore phase with a Ce/Zr molar ratio in a fixed range of about 1 in the ceria-zirconia complex oxide, but also to exhibit satisfactory oxygen storage capacity at low temperature, without disturbing the order of the pyrochlore phase even when it is exposed to high temperatures during temperature-programmed reduction (TPR) or oxygen storage capacity (OSC) evaluation (FIG. 1(a), (b) and Table 1, etc.).

Furthermore, again without the desire to be constrained by theory, presumably if the zirconia particles are monoclinic crystals, the matching between the lattice spacing and crystal surfaces of the ceria-zirconia complex oxide and zirconia particles is more satisfactory, it is possible for the ceria-zirconia complex oxide to form a lattice with about twice the periodicity of the ceria fluorite-type structure (FIG. 1(a), (b)), and thus, in addition to the Ce/Zr ratio in the fixed range mentioned above and treatment at low temperature, even smaller crystallite diameters can be obtained, a good orderly phase with a stable structure and satisfactory performance can be formed, and the oxygen storage capacity can be increased.

Furthermore, since by this mode of the invention, as explained below, it has become possible to control the upper limit for the particle diameters of the ceria-zirconia complex oxide to within the range of the upper limit calculated by computational theory, oxygen diffusion takes place at virtually all of the sites in the crystallites, the Ce utilization factor of the pyrochlore phase is extremely high, and it functions as a highly superior oxygen storage material (Table 1, Examples 1 and 2).

EXAMPLES

The invention will now be explained in more specific detail by examples, with the understanding that the invention is in no way limited to the examples.

<Production of Ceria-zirconia Complex Oxide Fine Particles with Pyrochlore Phase Supported on Zirconia Particles>

(Step 1: Synthesis Step)

A mixed aqueous solution of zirconium oxynitrate, cerium ammonium nitrate and zirconia particles was prepared, with the produced ceria-zirconia complex oxide fine particles containing Ce and Zr in amounts for a Ce/Zr molar ratio of 1.0. Specifically, 7 mmol of $(NH_4)_2Ce(NO_3)_6$ and 7 mmol of $ZrO(NO_3)_2$, as well as 14 mmol of $C_{17}H_{33}COOK$ (all by Wako Pure Chemical Industries, Ltd.), were dissolved in 100 ml of $H_2O$, and zirconia particles with a specific surface area of 12 $m^2/g$ (manufacturer: Tosoh Corp., Model No.: TZ0) were added. There was further added 20 ml of 25 wt % ammonia water for neutralization of the pH to 12 to produce a precipitate. The precipitate was kept at 200° C. for 24 hours for hydrothermal treatment, and the produced precipitate was subjected to solid-liquid separation by filtration or centrifugal separation, and dried.

(Step 2: Thermal Oxidation Treatment)

The ceria-zirconia complex oxide fine particles obtained in (step 1) were fired in air at 600° C. for 3 hours, and then additionally fired at (a) 800° C. or (b) at 1000° C. for 3 hours.

(Step 3: Temperature-programmed Reduction (TPR) Treatment)

Using 0.1 g of the specimen obtained in (step 2), reduction treatment was carried out using a temperature-programmed reduction apparatus (Model No.: BP-1S, manufacturer: Hemmi Slide Rule Co., Ltd.), with gas circulation of 5 vol % hydrogen-95 vol % argon (flow rate: 30 ml/min), raising the temperature from room temperature to 800° C. at a temperature-elevating rate of 10° C./min. At the same time, a thermal conductivity detector (TCD) was used to measure the amount of $H_2$ consumed by $O_2$ released from the specimen.

Example 1

(Step 1) to (step 3) were carried out.

Example 2

Loading of Pt fine particles was accomplished by an impregnation method. The Pt source used was a diluted aqueous solution of 4.5 wt % dinitrodiamine-platinum nitrate. The specimen obtained with a loading weight of Pt nanoparticles of 1.0 wt % with respect to the support (step 1) was added to the aqueous solution. The temperature was increased to 120° C. to 150° C. while stirring to evaporate the solvent. The obtained dry product was shredded and fired at 500° C. for 2 hours. After standing to cool, the fired product was shredded to obtain a catalyst powder.

Next, (step 2) and (step 3) were carried out for the specimen.

Comparative Example 1

There were prepared an aqueous solution of 14 mmol $(NH_4)_2Ce(NO_3)_6$ dissolved in 60 ml of $H_2O$ and an aqueous solution of 14 mmol $C_{17}H_{33}COOK$ dissolved in 60 ml of $H_2O$, as an organic protective agent, and the zirconia powder used in (step 1) of Example 1 was mixed with the Ce salt aqueous solution to a molar ratio of Ce:Zr=(a) 2:8 or (b) 1:9. The two solutions were combined and stirred while adding 10 ml of 25 wt % $NH_4OH$ for neutralization. The obtained dispersion was filtered and rinsed, and then freeze-dried to obtain a material having $CeO_2$ nanocubes supported on $ZrO_2$.

Next, specimens (a) and (b) were obtained for Comparative Example 1, having Pt supported by the same procedure as Example 2, except for using a material with the $CeO_2$ supported on $ZrO_2$.

Also, the temperature for (step 2: thermal oxidation treatment) was 800° C. and (step 2) and (step 3) were carried out for the specimen.

Comparative Example 2

For the specimen of (step 1), no zirconia particles were added, and only (step 2) was carried out at a temperature of 400° C., and without carrying out (step 3), to obtain a specimen for Comparative Example 2.

Comparative Example 3

A specimen supporting Pt was obtained by the same procedure as Example 2, except that in Example 2 the specimen of Comparative Example 2 was used, and (step 2) and (step 3) were not carried out.

Comparative Example 4

A ceria-zirconia solid solution powder was prepared with a ceria/zirconia molar ratio ($CeO_2:ZrO_2$) of 50:50. Specifically, after first dissolving 49.1 g of an aqueous solution of 28 mass % of cerium nitrate in terms of $CeO_2$, 54.7 g of an aqueous solution of 18 mass % of zirconium oxynitrate in terms of $ZrO_2$ and 1.2 g of a nonionic surfactant (trade name: RHEOCON, product of Lion Corp.) in 90 cc of ion-exchanged water, ammonia water with 25 mass % $NH_3$ was added at 1.2 equivalents with respect to the anion to produce coprecipitation, and the obtained coprecipitate was filtered and rinsed. The obtained coprecipitate was then dried at 110° C., after which it was fired in air at 1000° C. for 5 hours to obtain a solid solution of cerium and zirconium. The solid solution was then pulverized using a pulverizer (trade name: WONDER BLENDER by As One Corp.) to a mean particle diameter of 1000 nm, to obtain a ceria-zirconia solid solution powder with a ceria/zirconia molar ratio ($CeO_2:ZrO_2$) of 50:50.

Next, 50 g of the ceria-zirconia solid solution powder was packed into a polyethylene bag (0.05 L volume), the interior was deaerated, and the mouth of the bag was sealed by heating. A hydrostatic pressing apparatus (trade name: CK4-22-60 by Nikkiso Co., Ltd.) was then used for hydrostatic pressing (CIP) of the bag for 1 minute at a pressure of 300 MPa for molding, to obtain a ceria-zirconia solid solution powder as a solid starting material. This procedure was carried out several times to mold 10 solid starting materials.

Next, each of the 10 solid starting materials removed from their pressed bags was packed into a graphite circular cylindrical container (internal volume: 15 cm diameter, 20 cm height), and closed with a graphite cover. The circular cylindrical container was then placed in a furnace (graphite furnace) internally comprising a graphite heat-insulating material and a heating unit. The furnace interior was then evacuated to 0.01 Torr with a diffusion pump, after which argon gas was introduced to create a reducing atmosphere of 100 vol % argon gas. Next, the temperature in the furnace was increased to 1700° C. for heating of the solid specimen for 5 hours to accomplish reduction treatment, thereby obtaining a complex oxide precursor. This was followed by furnace cooling to an interior temperature 50° C., and the complex oxide precursor was removed from the furnace. The obtained complex oxide precursor was then heated in air for 5 hours under temperature conditions of 500° C. for oxidation, to obtain a ceria-zirconia complex oxide. The obtained ceria-zirconia complex oxide was pulverized with a mortar to form a powder with a particle diameter of 5 μm.

Oxygen Storage Capacity (OSC) Evaluation

Following the temperature-programmed reduction treatment described above, oxygen was introduced into the argon gas stream in a pulse manner by an oxygen pulse method, using a measuring device (Model No.: BP-1S, manufacturer: Hemmi Slide Rule Co., Ltd.), and oxygen was adsorbed onto the specimens of the examples and comparative examples at 600° C. The value of the oxygen adsorption (oxygen storage capacity: OSC) was simultaneously measured based on the total adsorption of oxygen.

Cycle Evaluation

For the specimens of the examples and comparative examples, (step 3) and evaluation of the oxygen storage capacity (OSC) were respectively conducted every cycle and every 2 cycles, and the values at TPR and OSC treatment were measured as the first and second cycles, respectively.

(OSC Measurement Results)

Table 1 shows the results of oxygen storage capacity (OSC) evaluation for the specimens of Examples 1 and 2 and Comparative Examples 1 to 3.

TABLE 1

| Specimen | Cycle number | Build-up temperature ° C. | OSC (ml/g) | Ce utilization factor (%) |
| --- | --- | --- | --- | --- |
| Example 1(a) | 1 | 310/345 | 3.6 | 83 |
|  | 2 | 270/335 | 3.9 | 90 |
| Example 1(b) | 1 | 310/340 | 2.6 | 60 |
|  | 2 | 235/250 | 3.1 | 72 |
| Example 2(a) | 1 |  | 3.8 | 87 |
|  | 2 |  | 3.9 | 89 |
| Example 2(b) | 1 |  | 3.8 | 87 |
|  | 2 |  | 3.9 | 89 |
| Comp. Example 1(a) | 1 |  | 4.1 | 49 |
|  | 2 |  | 4.2 | 50 |
| Comp. Example 1(b) | 1 |  | 1.9 | 43 |
|  | 2 |  | 2.2 | 50 |
| Comp. Example 2 | 1 |  | 3.6 | 19 |
|  | 2 |  | 3.8 | 20 |
| Comp. Example 3 | 1 |  | 6.2 | 32 |
|  | 2 |  | 9.0 | 47 |

The build-up temperatures in Table 1 are each the point of inflection in a TPR graph plotting detection amount by TCD with respect to temperature, where the curve more sharply turns toward the minus end (indicating consumption of hydrogen).

As shown in Table 1, calculating from a theoretical value of 18.9 ml/g for a Ce utilization factor of 50% and a theoretical value of 4.37 ml/g for a Ce utilization factor of 10%, it was found surprisingly that very high Ce utilization factors has been achieved, of 60% to 90% in Example 1(a) and (b) and 87% to 89% in Example 2(a) and (b), compared to 43% to 50% for Comparative Example 1, 19% to 20% for Comparative Example 2 (assumed to have no pyrochlore phase production) and 32% to 47% for Comparative Example 3.

(Temperature-programmed Reduction (TPR) Measurement Results)

The results for Example 1(a) and (b) and Example 2(a) and (b) following (step 3) are shown in FIGS. 3(a) to (d), respectively. In FIGS. 3(a) to (d), "1st time" and "2nd time" represent the cycle number in the cycle evaluation.

As seen from FIG. 3, the specimen of Example 2(a) exhibited hydrogen consumption in TPR and oxygen storage (release) capacity from 80° C. (FIG. 3(c)), while the specimen of Example 2(b) exhibited the same from 100° C. (FIG. 3(d)).

(XRD Measurement)

The specimen of Example 1(b) was subjected to XRD measurement using an XRD device (Model No.: RINT, manufacturer: Rigaku Corp.), and the diffraction profile attributed to $CeO_2$ (solid solution) was observed, in addition to the diffraction profile for monoclinic crystalline $ZrO_2$.

(TEM Measurement)

Upon measurement of the specimen of Example 1(b) using a JEM-2100F by JEOL Corp. (acceleration voltage: 200 kV) equipped with a field emission electron gun, there was observed formation of ceria-zirconia nanocrystal fine particles with particle diameters of about 10 nm on zirconia particles (FIGS. 1(a) and (b)), and also formation of a pyrochlore phase ordered with about twice the periodicity of the basic lattice, as seen from the lattice image.

Figure 1C:
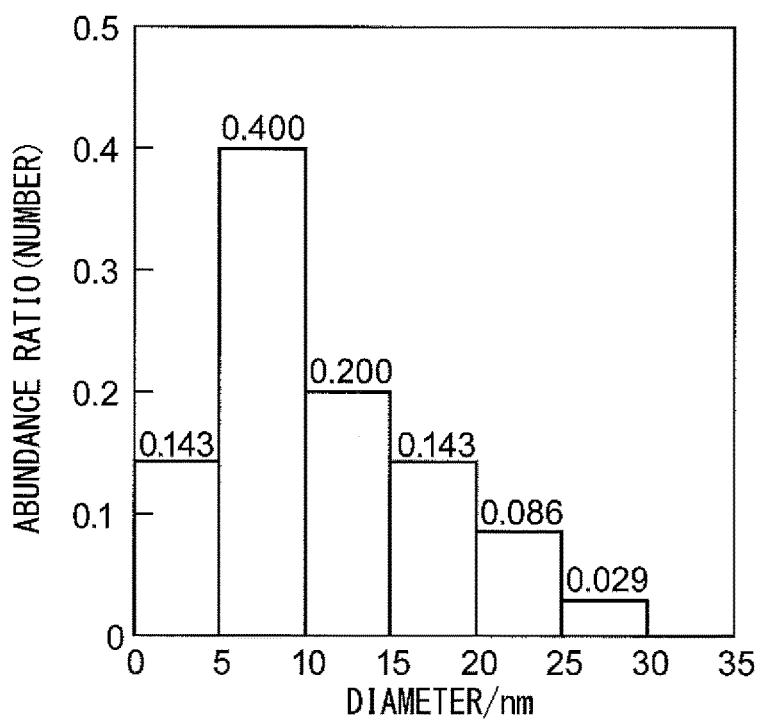
FIG. 1(c) is a graph showing the results for measurement of the crystallite diameters of the cerium zirconium complex oxide of Example 1(b), with the abundance ratio within each particle diameter range plotted as a number with respect to the crystallite diameter (nm), where the total of 35 fine particles is defined as 1.
Figure 1D:
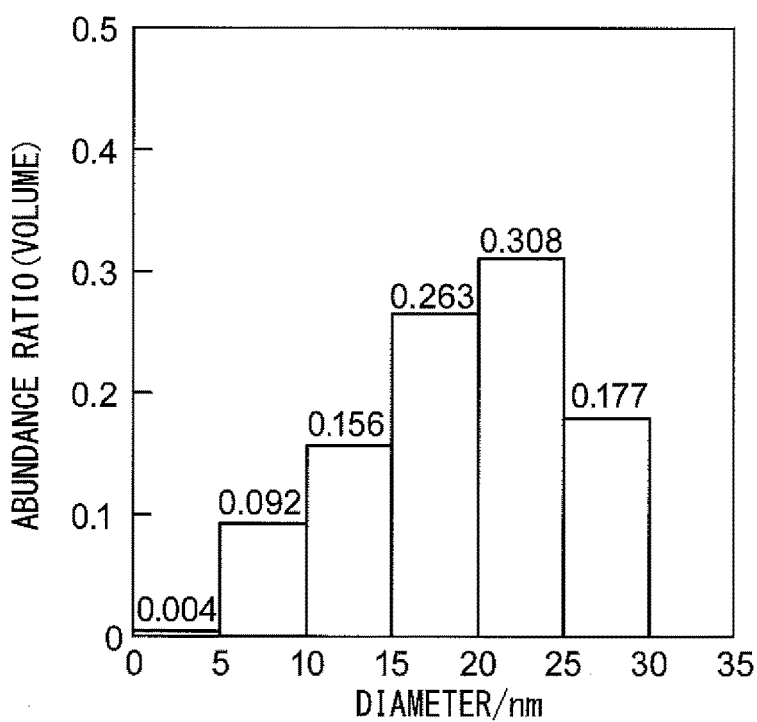
FIG. 1(d) is a graph showing the results for measurement of the crystallite diameters of the cerium zirconium complex oxide of Example 1(b), with the abundance ratio within each particle diameter range plotted as volume with respect to the crystallite diameter (nm), where the total of 35 fine particles is defined as 1.

Also, FIG. 1 shows the results for measurement of the crystallite diameters of the cerium zirconium complex oxide of Example 1(b), with the abundance ratio within each particle diameter range plotted as number (FIG. 1(c)) or volume (FIG. 1(d)) with respect to the crystallite diameter (nm), where the total of 35 fine particles is defined as 1.

The particle diameter ranges in FIGS. 1(c) and (d) are ranges greater than the lower limit and up to and including the upper limit; for example, the second bar from the left represents >5 nm and ≤10.

From FIG. 1(c) it is clear that in this complex oxide, 97.1% of the total crystallites were 25 nm or smaller and 74.3% were 15 nm or smaller, based on number.

Figure 1E:
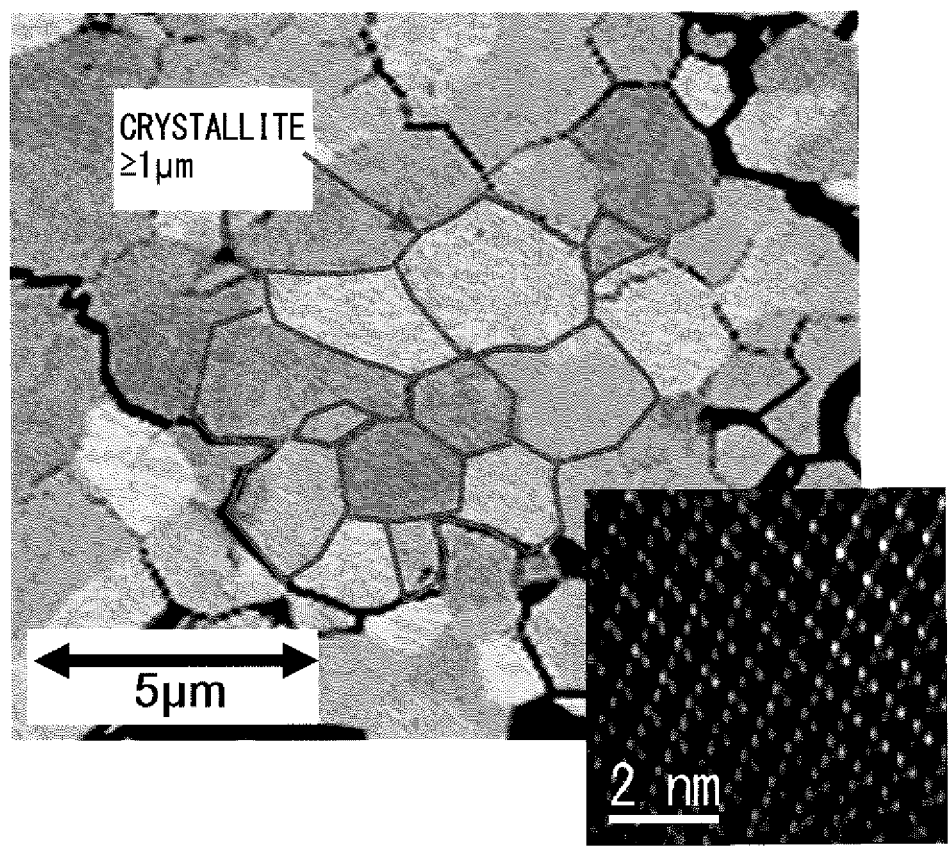
FIG. 1(e) is an SEM photograph of the specimen of Comparative Example 4.
Figure 2A:
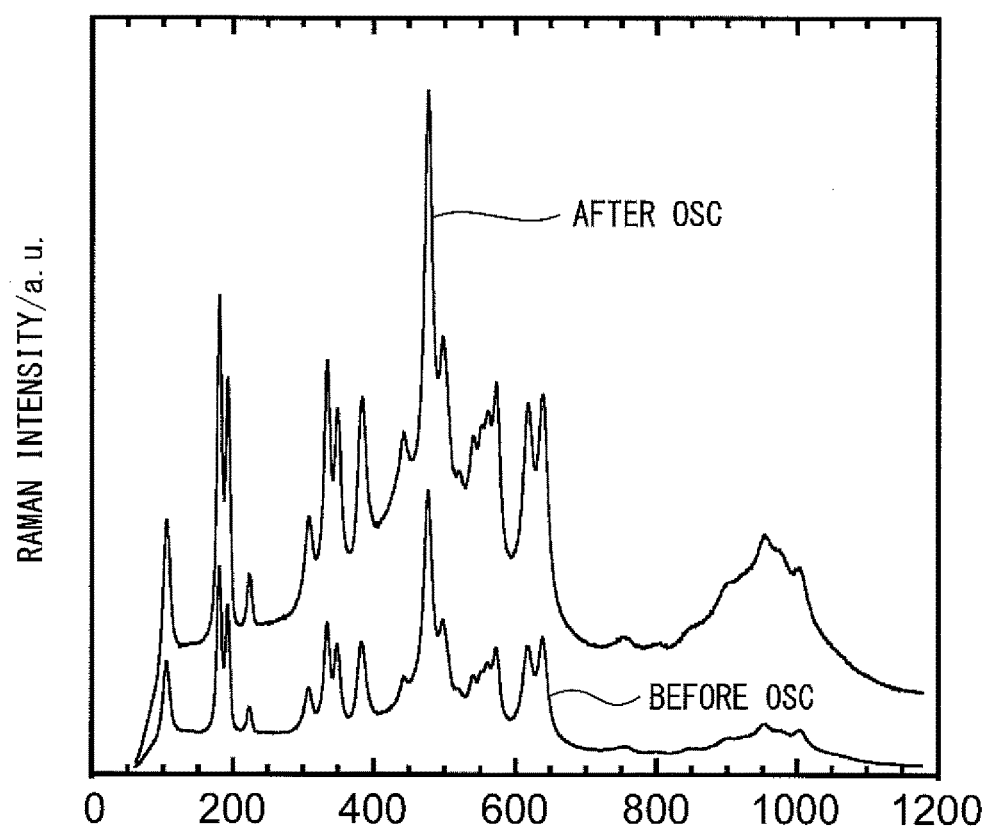
FIG. 2(a) is a graph showing the measurement results for Raman intensity with respect to wavelength for the specimen of Example 1(a) (800° C. oxidizing treatment in step 2), before and after evaluation of the oxygen storage capacity (OSC).
Figure 2C:
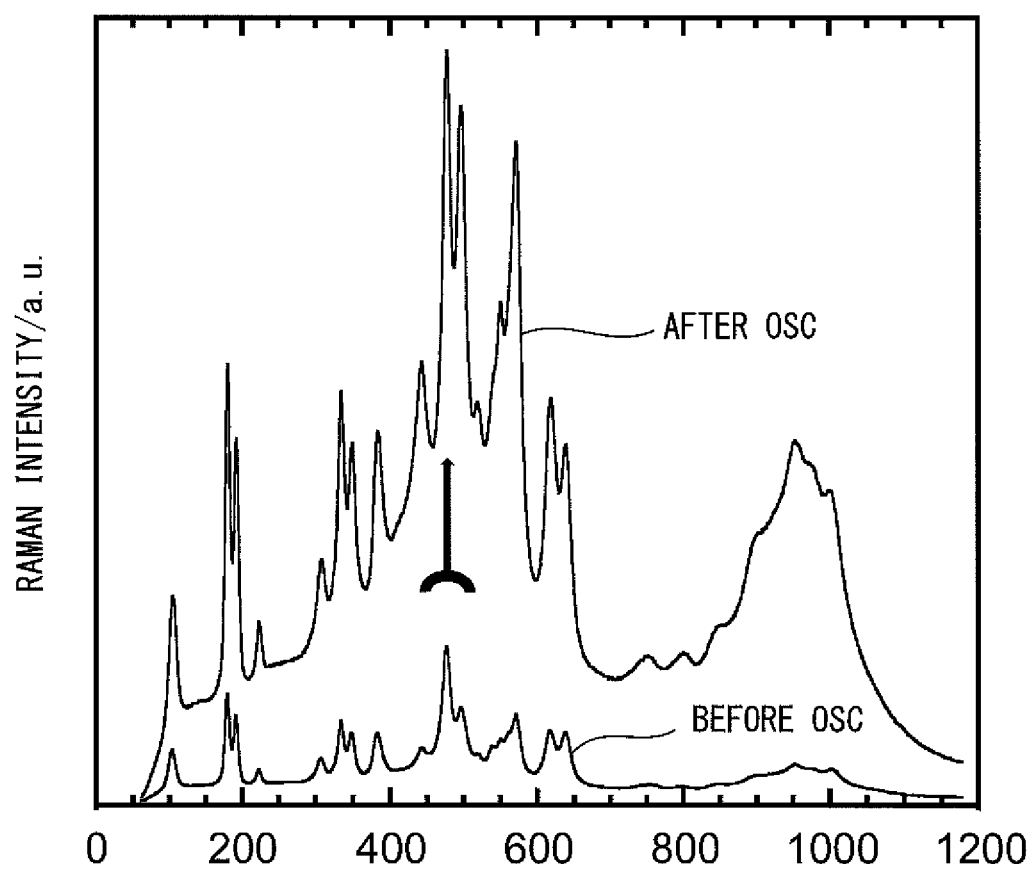
FIG. 2(c) is a graph showing the measurement results for Raman intensity with respect to wavelength for the specimen of Example 2(a) (800° C. oxidizing treatment in step 2), before and after evaluation of the oxygen storage capacity (OSC).
Figure 2D:
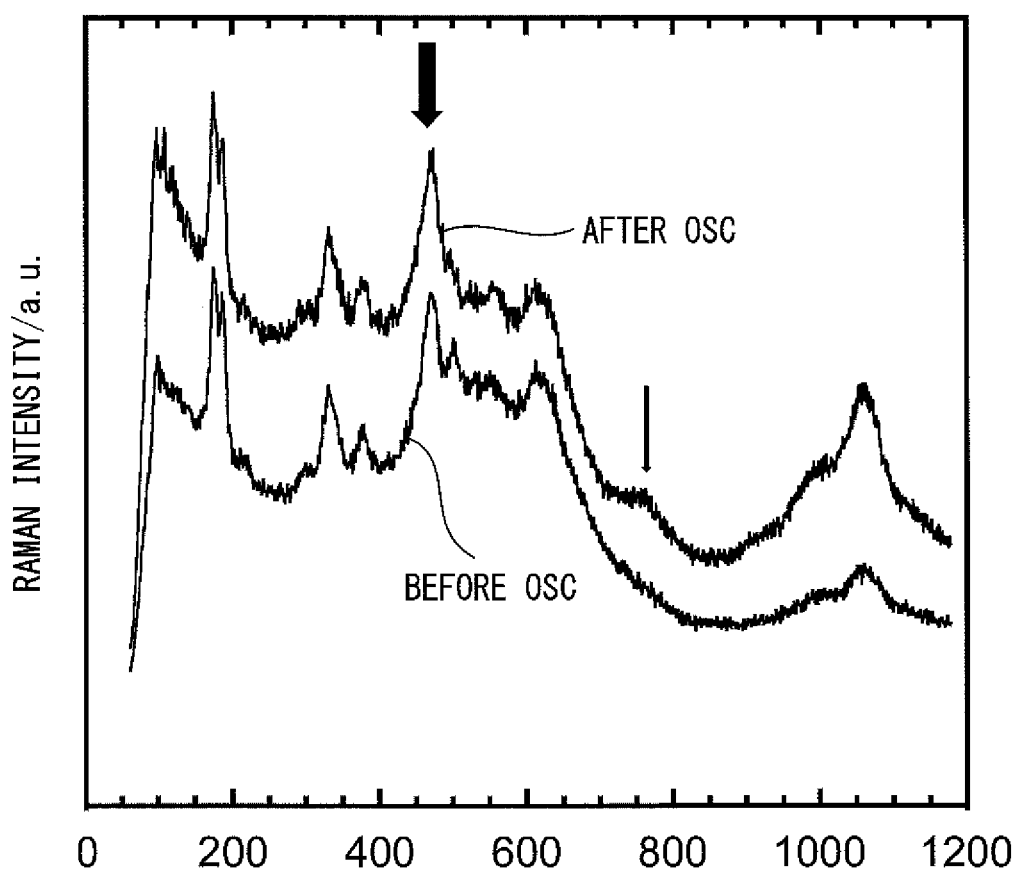
FIG. 2(d) is a graph showing the measurement results for Raman intensity with respect to wavelength for the specimen of Example 2(b) (1000° C. oxidizing treatment in step 2), before and after evaluation of the oxygen storage capacity (OSC).
Figure 3A:
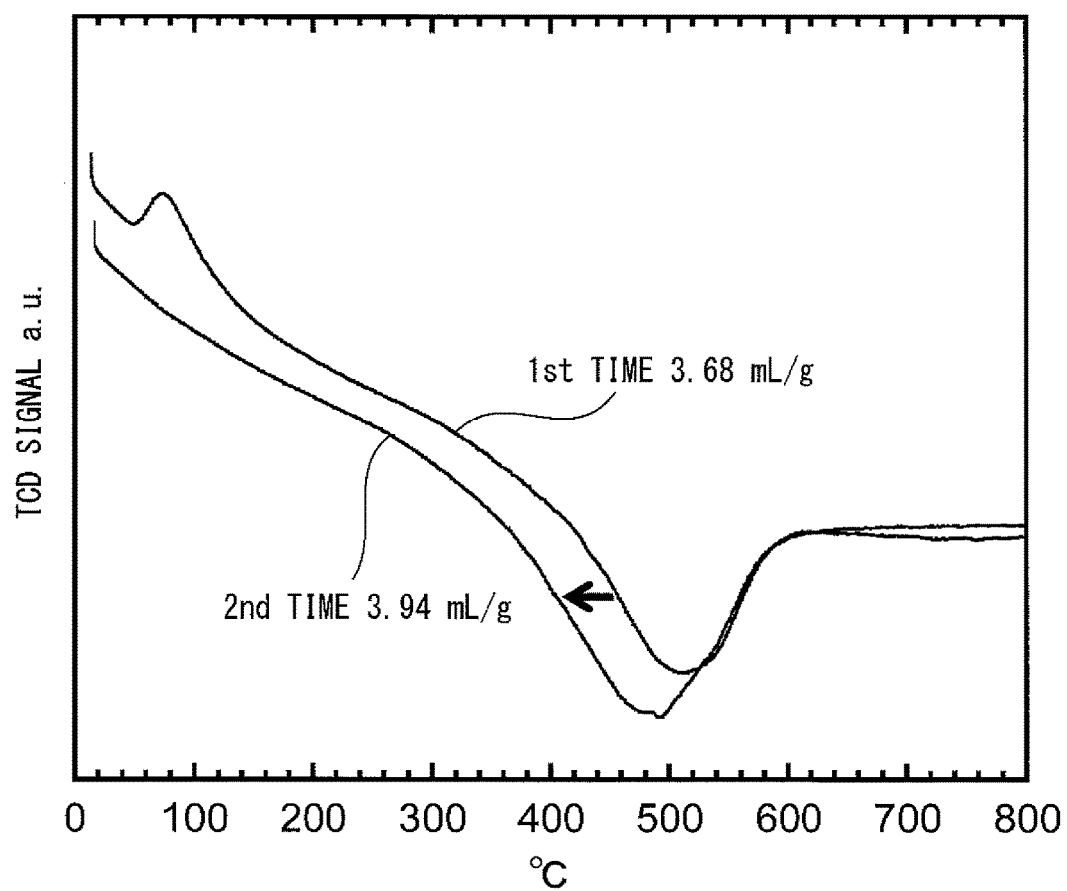
FIG. 3(a) is graph showing the measurement results for the TCD signal with respect to temperature, for the specimen of Example 1(a) (arbitrary scale, same hereunder for FIG. 3).
Figure 3B:
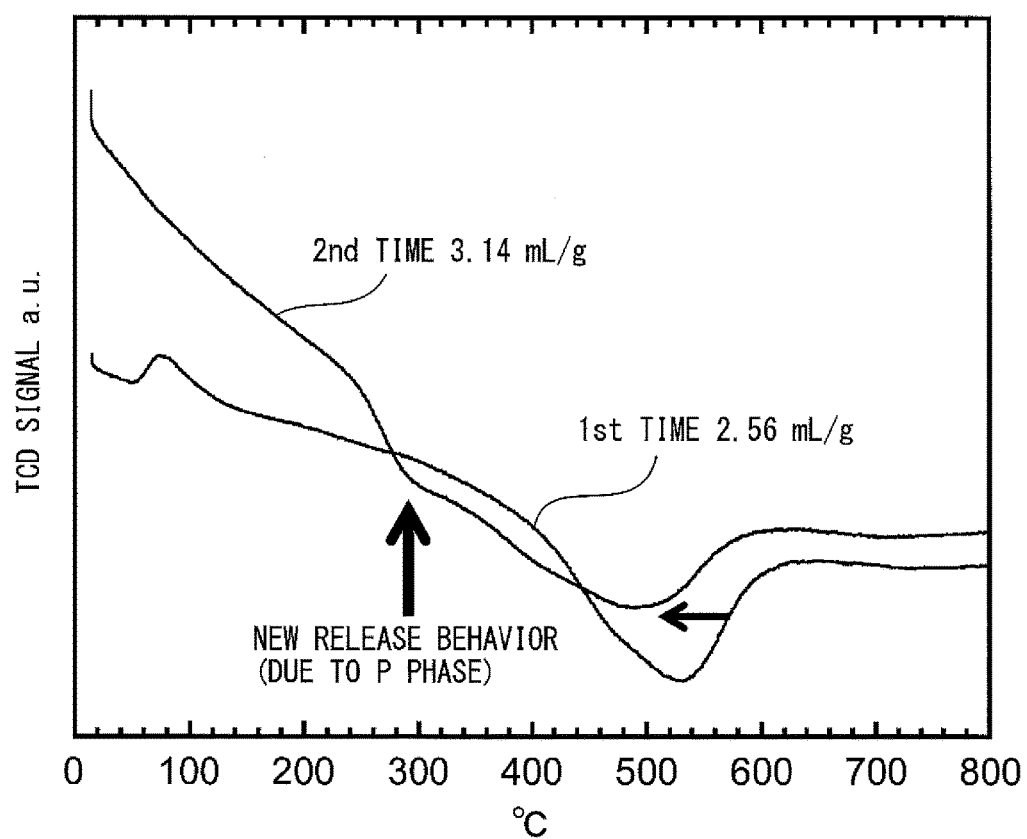
FIG. 3(b) is graph showing the measurement results for the TCD signal with respect to temperature, for the specimen of Example 1(b).
Figure 3C:
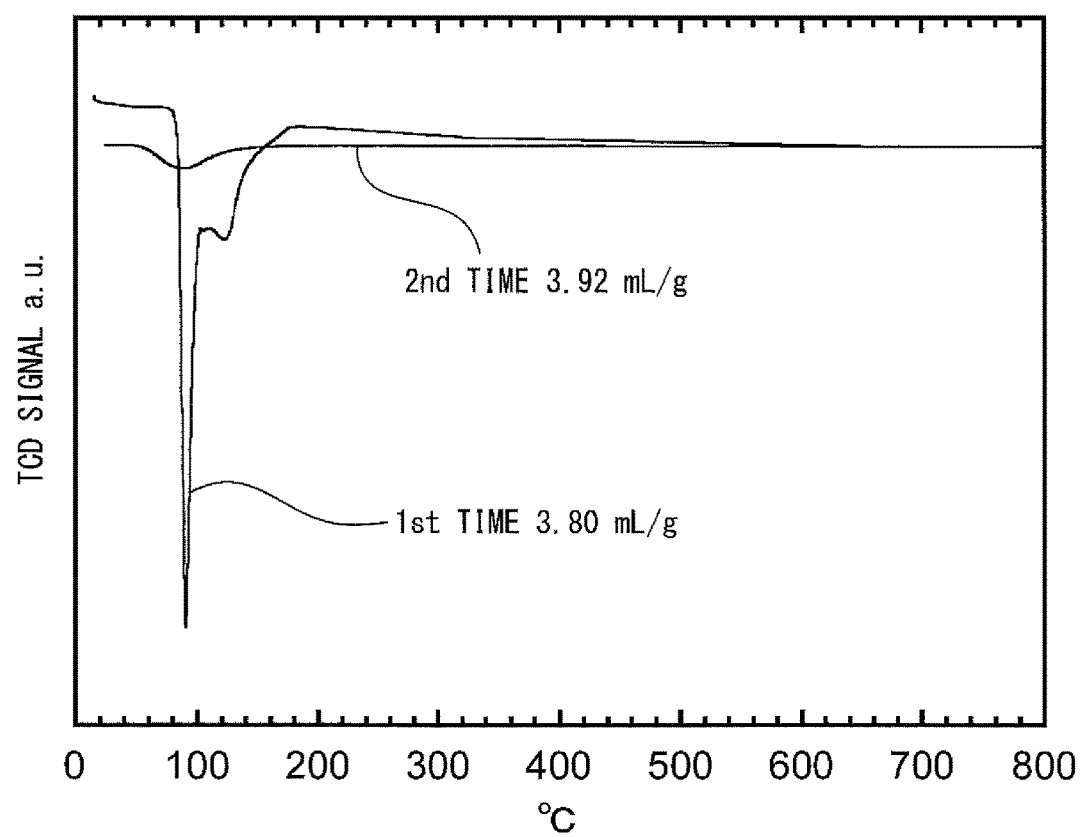
FIG. 3(c) is graph showing the measurement results for the TCD signal with respect to temperature, for the specimen of Example 2(a).
Figure 3D:
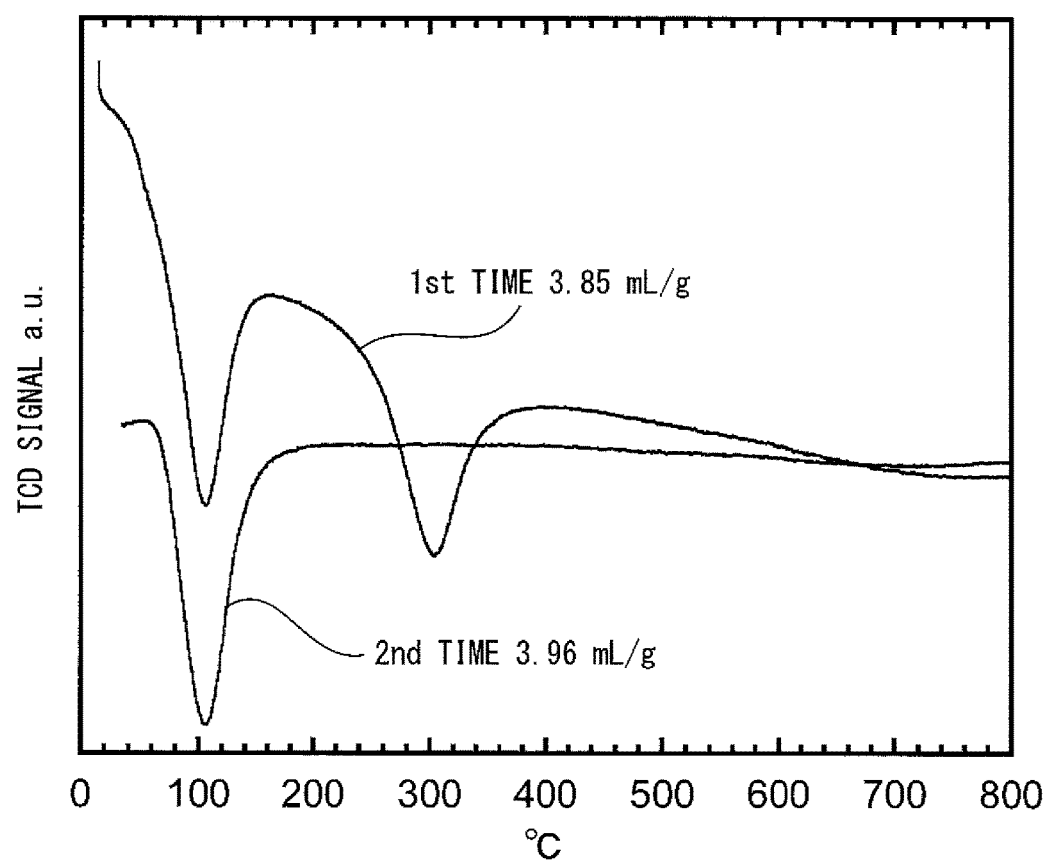
FIG. 3(d) is graph showing the measurement results for the TCD signal with respect to temperature, for the specimen of Example 2(b).

On the other hand, upon measuring the specimen of Comparative Example 4, mean crystallite diameters of about 1 μm and greater were observed (FIG. 1(e)), confirming large mean crystallite diameters.

As used herein, unless otherwise specified, "particle diameter" refers to the maximum diameter of a particle measured from a TEM image, "crystallite diameter", unless otherwise specified, refers to the maximum diameter of a crystallite measured from a TEM image, and "mean particle diameter" or "mean crystallite diameter" refers to the mean value for 35 particle diameters or crystallite diameters, based on a TEM image.

(Raman Spectrophotometry)

Upon measuring the Raman scattering for the specimens of Example 1(a), Example 1(b), Example 2(a) and Example 2(b) using a Raman spectroscope (Model No. MRS-3100, manufacturer: JASCO Corp.), reduction and broadening of the Raman intensity of the $CeO_2$ phase (homogeneous solid solution) was seen at 460 $cm^{-1}$ (FIG. 2(a), FIG. 2(b), FIG. 2(c) and FIG. 2(d), respectively), before and after oxygen storage capacity (OSC) evaluation.

This indicates that changes took place in Ce—O bonding, such as a reduced number of Ce—O bonds and reduced crystal symmetry, or in other words that a $Ce_2Zr_2O_7$ phase with $Ce^{3+}$ in (step 3) and a $Ce_2Zr_2O_8$ phase with $Ce^{4+}$ in oxygen storage capacity (OSC) evaluation had formed, which were apparent in the Raman scattering.

(Measurement of Water Formation by Hydrogen Oxidation)

The specimens of Example 1(b) and Comparative Example 4, obtained from (step 3), were again subjected to (step 3: temperature-programmed reduction treatment) after (step 2: thermal oxidation treatment) at 400° C. FIG. 4 shows the results for the $H_2$ consumption rate ($H_2O$ formation rate) with respect to temperature for each specimen (corresponding to FIGS. 4(a) and (b), respectively).

As seen from FIG. 4, with the specimen of Comparative Example 4, $H_2O$ formation due to released oxygen was observed only from 450° C., and the maximum peak for the water formation rate was at approximately 700° C. (Fig. 4(b)).

In contrast, with the specimen of Example 1(b), oxygen was released and $H_2O$ formed even from a low temperature of about 300° C., the maximum peak for the $H_2O$ formation rate by oxygen release being about 550° C. (FIG. 4(a)), thus demonstrating that oxygen can be satisfactorily released even from a much lower temperature than Comparative Example 4.

(Calculation of Upper Limit for Crystallite Diameter)

The cause of release of oxygen at low temperature with fine particles is that as the fine particles become smaller, the diffusion length required for oxygen to leave the solid easily exceeds the radius. On the basis of these results, the theoretical upper limit for the crystallite diameter of ceria-zirconia crystallites having an ordered phase exhibiting oxygen storage capacity at below 450° C. was calculated for the ceria-zirconia complex oxide of this mode of the invention.

Diffusion of oxygen in the solid can be described by the following diffusion formula.

$D=D_0 \exp(-\Delta E/RT)$, where $D$ and $D_0$ are diffusion coefficients ($m^2$/sec), $\Delta E$ is the activation energy, R is the gas constant and T is the temperature (K).

According to a published article (F. Dong et al., Catal. Today, 90(2004), 223-229), the oxygen diffusion coefficient from a bulk ceria-zirconia ordered phase is $7.77 \times 10^{-22}$ $m^2$/sec at 411° C., the activation energy is 19 kJ/mol and $D_0$ is calculated as $2.20 \times 10^{-20}$.

For the ceria-zirconia orderly phase of Comparative Example 4, D (Comparative Example 4) is calculated to be $9.31 \times 10^{-22}$ at this temperature based on observation of the oxygen released from 450° C. (FIG. 4(b)).

In Example 1(b), however, the same calculation yielded a D value (Example 1) of $4.07 \times 10^{-22}$ $m^2$/sec, based on observation of oxygen release from about 300° C. (FIG. 4(a)).

Thus, for the ordered phase of ceria-zirconia complex oxide exhibiting oxygen storage capacity at lower temperatures than 450° C., which is the OSC temperature for Comparative Example 4, the equation is crystallite diameter=D (Comparative Example 4)/D (Example 1(b))× crystallite diameter of Comparative Example $4=2.29 \times 10$ nm=22.9 nm. Thus, if the mean crystallite diameter less than 22.9 nm, oxygen storage capacity can be exhibited throughout the crystallites at below 450° C.

INDUSTRIAL APPLICABILITY

As explained above, the oxygen storage material of the described mode of the invention has satisfactory oxygen storage capacity even at low temperatures, due to a ceria-zirconia complex oxide having small crystallite diameters and a stabilized pyrochlore phase, and therefore the amount of cerium usage can be drastically reduced, and it is possible to obtain high NOx purification performance in a wide range of exhaust gas temperatures.

What is claimed is:

1. A method for producing an oxygen storage material, the oxygen storage material comprising:
   zirconia particles and
   a ceria-zirconia complex oxide supported on the zirconia particles, wherein the ceria-zirconia complex oxide includes a pyrochlore phase and has a mean crystallite diameter of 10 nm to 22.9 nm,
the method comprising the following steps in order:
   (i) a step of preparing an aqueous solution containing:
       a water-soluble cerium salt,
       a water-soluble zirconium salt or oxyzirconium salt,
       a complexing agent that is an alkylcarboxylic acid and/or an alkylcarboxylic acid salt, and
       zirconia particles,
   (ii) adding an aqueous alkali solution to the aqueous solution of (i),
   (iii) holding the aqueous solution mixture of (ii) at a temperature of 180° C. to 220° C. for 0.5 hours to 72 hours to produce a solid product by precipitation,
   (iv) holding the solid product at a temperature of 500° C. to 700° C. for 1 hour to 5 hours and then at a temperature of 700° C. to 1100° C. for 1 hour to 5 hours, and
   (v) further subjecting the solid product to temperature-programmed reduction treatment.

* * * * *